(12) United States Patent
Ravichandran

(10) Patent No.: US 10,992,800 B2
(45) Date of Patent: Apr. 27, 2021

(54) TELECOMMUNICATIONS NETWORK CALLING-PARTY CONTEXT-BASED IDENTIFICATION

(71) Applicant: T-Mobile USA, Inc., Bellevue, WA (US)

(72) Inventor: Vinod Ravichandran, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/285,363

(22) Filed: Feb. 26, 2019

(65) Prior Publication Data

US 2020/0274964 A1 Aug. 27, 2020

(51) Int. Cl.
*H04M 3/42* (2006.01)
*H04L 29/06* (2006.01)

(52) U.S. Cl.
CPC .... *H04M 3/42042* (2013.01); *H04L 65/1006* (2013.01); *H04L 65/1069* (2013.01); *H04M 3/42059* (2013.01); *H04M 3/42102* (2013.01); *H04L 65/1016* (2013.01); *H04L 65/1063* (2013.01)

(58) Field of Classification Search
None
See application file for complete search history.

(56) References Cited

U.S. PATENT DOCUMENTS

| 10,111,088 | B1 * | 10/2018 | Bertz | H04L 61/1511 |
| 2008/0151869 | A1 * | 6/2008 | Sylvain | H04L 65/80 370/352 |
| 2009/0013078 | A1 * | 1/2009 | Bencheikh | H04L 65/80 709/227 |
| 2013/0070914 | A1 * | 3/2013 | Raghav | H04M 1/575 379/88.21 |

(Continued)

OTHER PUBLICATIONS

Alvestrand, "Overview: Real Time Protocols for Browser-based Applications Draft-Ietf-rtcweb-overview-19", Nov. 12, 2017, 24 pages.

(Continued)

*Primary Examiner* — Chi H Pham
*Assistant Examiner* — Raul Rivas
(74) *Attorney, Agent, or Firm* — Lee & Hayes, P.C.

(57) ABSTRACT

A control device of a telecommunications network can receive a session-initiation message and determine a context identifier associated with at least one of a calling-party identifier and a called-party identifier of the message. The control device can retrieve calling-party identification information from an information server based at least in part on the calling-party identifier and the context identifier. The control device can determine a second session-initiation message comprising the calling-party identification information based at least in part on the session-initiation message and send the second session-initiation message via the telecommunications network. An information server can receive a query and select, based at least in part on context information thereof, a calling-party identification informa- (Continued)

tion value associated with a calling-party identifier in the query. The information server can send, via the network, a response comprising the calling-party identification information value.

20 Claims, 7 Drawing Sheets

(56) References Cited

U.S. PATENT DOCUMENTS

2018/0295140 A1* 10/2018 Lu ................. H04L 63/1416
2019/0089844 A1* 3/2019 Sharma ............. H04M 15/00

OTHER PUBLICATIONS

Bernhold, E., "Caller ID vs CNAM", retrieved Jul. 19, 2018 from <<https://support.telnyx.com/voice-and-fax/caller-id-vs-cnam>>, 3 pages.

Cisco, "Calling Name Delivery (CNAM)", Aug. 3, 2007, retrieved Aug. 14, 2018 from <<https://www.cisco.com/c/en/us/td/docs/voice_ip_comm/pgw/9/feature/module/9-7_3_/cnam.html>>, 12 pages.

Cisco, "Network and Subscriber Feature Descriptions", Oct. 31, 2013, retrieved Jul. 19, 2018 from <<https://www.cisco.com/c/en/us/td/docs/voice_ip_comm/bts/5-0/feature/description/featdesc/fd5020sf.html#wp1131693>>, pp. 54-63.

Jennings et al., "Private Extensions to the Session Initiation Protocol (SIP) for Asserted Identity Within Trusted Networks", Request for Comments 3325, Nov. 2002, 18 pages.

Holmberg, et al., "Web Real-Time Communication Use Cases and Requirements", Request for Comments 7478, Mar. 2015, 29 pages.

"SIP Trunk Providers", ARS Technica, Jan. 7, 2013, retrieved Jul. 19, 2018 from <<https://arstechnica.com/civis/viewtopic.php?t=1190173>>, 14 pages.

"Unified Communications and Collaboration as a Service for Government", Verizon, Apr. 2017, retrieved Aug. 10, 2018 from <<http://www.verizonenterprise.com/industry/public_sector/federal/ucc/uccaas_govt_fact_sheet.pdf>>, 2 pages.

* cited by examiner

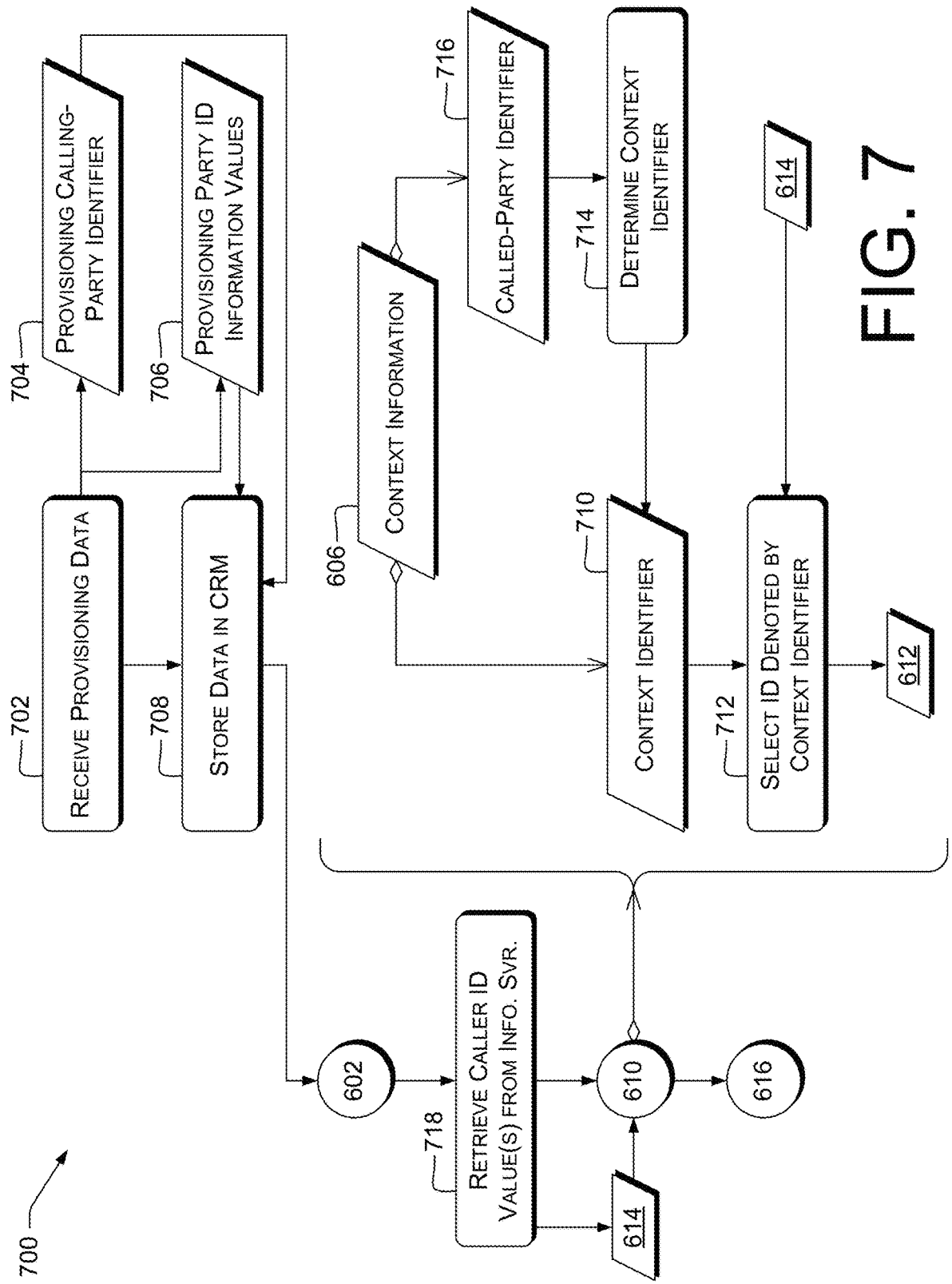

TELECOMMUNICATIONS NETWORK CALLING-PARTY CONTEXT-BASED IDENTIFICATION

CROSS-REFERENCE TO RELATED APPLICATIONS

Not Applicable

BACKGROUND

Many computing devices configured for telecommunications, such as smartphones, are capable of processing various types and encodings of media and interacting with various network services in addition to, e.g., two-party voice telephone calls. Examples of such media or services can include email, video calling, or multi-party conferencing. Unified Communications and Collaboration as a Service (UCCaaS) platforms and services provide chat, conferencing, presence, calling, and other communication services. UCCaaS services (for brevity hereinafter, "CCS" services) can be provided to a portable terminal such as a smartphone, e.g., using a native dialer. Additionally or alternatively, a portable terminal can access CCS over the top (OTT) via apps that carry CCS traffic via a packet network to which the terminal connects.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 7 illustrates example processes for provisioning and selecting calling-party information according to some implementations.

DETAILED DESCRIPTION

Overview

Figure 1:
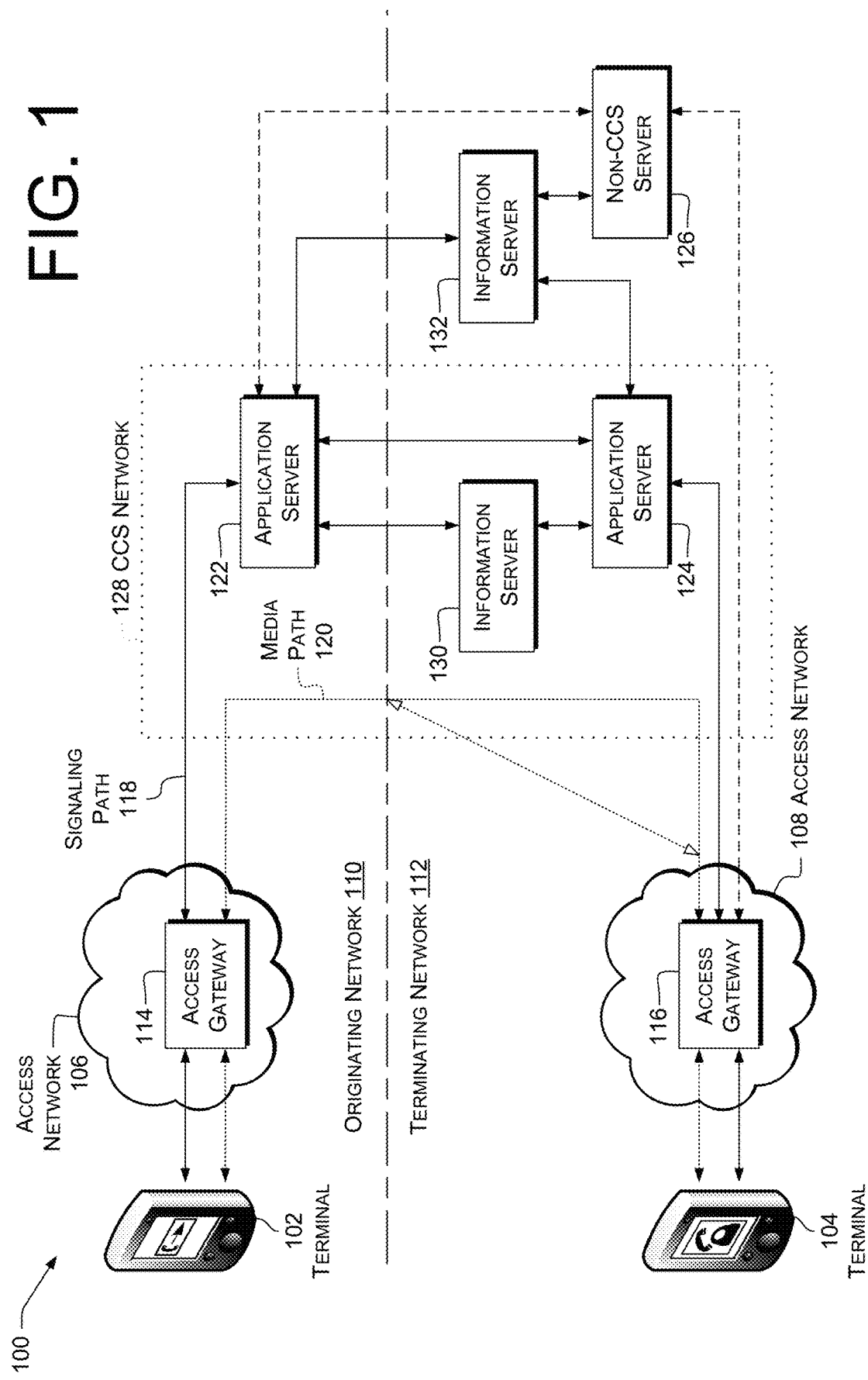
FIG. 1 is a block diagram illustrating a system for implementing network calling-party information control according to some implementations.

Various aspects relate to CCS implementations using app- or browser-based OTT communications via a dedicated CCS network. For example, a browser or app running on a PC, smartphone, or tablet can access CCS using Web Real-Time Communications (WebRTC) protocols. In some examples, when a CCS client calls another CCS client in the same CCS tenant, "internal-domain" caller ID name (CNAM) information will be presented to the called party. In some examples, when a CCS client calls a CCS client in a different CCS tenant, an Internet Protocol (IP) Multimedia Subsystem (IMS) terminal, or a public switched telephone network (PSTN) phone, "external-domain" CNAM information will be presented to the called party. The CNAM can be selected by the originating- or terminating-side CCS application server, or by a terminating-side non-CCS application server.

Some example systems and techniques described herein provide more accurate or relevant CNAM information to called parties. Some examples can reduce the rate of missed or ignored calls, which can in turn reduce waste of network capacity due to incomplete attempts to initiate sessions. Some examples can improve user privacy by controlling the CNAM information provided to called parties.

As used herein, a "terminal" is a communication device, e.g., a cellular telephone or other user equipment (UE), configured to perform, or intercommunicate with systems configured to perform, techniques described herein. Terminals can include, e.g., wireless voice- or data-communication devices. A terminal can include a user interface (e.g., as does a smartphone), but is not required to. For example, a streaming server configured to provide audio or visual content on demand can be a terminal. Such a terminal may not include a user interface, and may instead respond to other terminals that form queries and send those queries to the server in response to actions taken via interfaces at those other terminals.

The term "session" as used herein includes a communications path for bidirectional exchange of data among two or more terminals. Example sessions include voice and video calls, e.g., by which human beings converse, a data communication session, e.g., between two electronic systems or between an electronic system and a human being. Sessions can be conduced using 3GPP, Signaling System 7 (SS7), CCS, or Rich Communication Suite (RCS, also known as JOYN) protocols.

Example networks carrying sessions include second-generation (2G) cellular networks such as the Global System for Mobile Communications (GSM) and third-generation (3G) cellular networks such as the Universal Mobile Telecommunications System (UMTS). Other example networks include fourth-generation (4G) cellular networks, such as Long Term Evolution (LTE) cellular networks carrying voice over LTE (VoLTE) sessions using Session Initiation Protocol (SIP) signaling, fifth-generation (5G) cellular networks, the PSTN using SS7 signaling, and data networks, such as Institute of Electrical and Electronics Engineers (IEEE) 802.11 (WIFI) networks carrying voice over Internet Protocol (VoIP) calls or other OTT sessions encapsulating, e.g., voice or video data in a way transparent to an underlying packet transport. GSM and the PSTN are examples of circuit-switched (CS) networks; LTE and WIFI are examples of packet-switched (PS) networks. In some examples, OTT traffic, e.g., of CCS sessions, can be carried via 3G General Packet Radio Service (GPRS), 4G LTE, 5G, WIFI, or other packet networks.

Example CCS services can include, e.g., audio calling; video calling; presence-information subscription, publishing, and notification; instant messaging ("chat," e.g., via XMPP, IRC, Zephyr, or other protocols); screen-sharing, collaborative whiteboards or document-editing, or other forms of collaborative editing, or remote desktop access; voice messaging; multimedia conferencing (e.g., voice+ video, or voice+video+screen-sharing); emergency-call handling and routing; and integration of any of the above with email, calendaring, or other business information systems.

Further example CCS services can include routing, transferring, and other handling of incoming or outgoing voice or video calls or instant-messaging sessions. For example, incoming calls or instant messages addressed to a particular department can be routed by a CCS platform to members of that department who are available to receive those calls or messages. In various examples herein, outgoing calls or messages can be marked with CNAM information associated with not with the sender, but with the department with which the sender is associated. In some examples, processes described herein with reference to FIGS. 1-7 can be used to determine or transmit calling-party identification information with respect to any of these services or with respect to sessions carrying any of these types of media.

A CCS "tenant," as used herein, is a group of users, CCS subscriber companies, or other entities created to distinguish intra-tenant operations from inter-tenant operations. For example, a group can subscribe to CCS services provided by a cellular carrier or other networking provider. The tenant associated with that group can be a user group including the CCS user accounts for users associated with that group. A single group can be associated with multiple tenants, e.g., for different physical offices or departments within a company.

Illustrative Configurations

FIG. 1 is a block diagram illustrating a telecommunication system 100 according to some examples. The system includes terminals 102 and 104, e.g., user equipment or other mobile phones, or other computing or communications devices. The terminals 102 and 104 can be operated, e.g., by respective users. The terminals 102 and 104 are communicatively connected to one or more packet network(s), e.g., via respective access networks 106 and 108. For brevity of explanation, without limitation, various examples are described herein in the context of a session initiated by terminal 102 and addressed to terminal 104. Accordingly, terminal 102 and other components are shown as parts of an originating network 110, and terminal 104 and other components are shown as parts of a terminating network 112. The illustrated division of functions between originating network 110 and terminating network 112 is nonlimiting.

In some examples, access network 106 includes an access gateway 114, or access network 108 includes an access gateway 116. Access gateways 114, 116 can permit terminals 102, 104 to transmit and receive signaling messages, e.g., as defined in the VoLTE standards, via signaling path 118. For example, signaling messages can be used to establish a session. Data of the session, such as audio data or video data, can be exchanged between terminals 102 and 104 via a media path 120 (shown stippled). In some examples, media path 120 can pass through or involve access gateway 114, or one or more media gateways (omitted for brevity). Signaling path 118 and media path 120 are shown for clarity of explanation. However, in some examples, signaling messages can travel over paths instead of or in addition to signaling path 118, or media messages can travel over paths instead of or in addition to media path 120.

Calling name identification is a common service offered by telecommunication carriers. In some examples, a call-processing server retrieves identifying information regarding the caller from a database and provides that information to the called party. In various examples, the information provided to the called party can vary depending on the domain or tenant to which the call is addressed.

In some examples, a 4G Evolved Packet Core (EPC) can include a serving gateway (S-GW) that functions as an access gateway 114, 116. Additionally or alternatively, access gateway 114, 116 can be or include a server that converts between non-SIP signaling carried over WebRTC and SIP signaling carried, e.g., via an IMS network. Additionally or alternatively, access gateway 114, 116 can transcode media, e.g., from VP8 video over a WebRTC Secure Real-Time Transport Protocol (SRTP) link to H.264 video for Video over LTE (ViLTE). Additionally or alternatively, e.g., for communication with peers connected to a network through Network Address Translation (NAT) relays, access gateway 114, 116 can be or include a Traversal Using Relays around NAT (TURN) server or network function. The TURN server can be located on the opposite side of a NAT relay from a peer and can provide connectivity to that peer, e.g., via WebRTC. In other examples, other components of access networks 106, 108 can provide the functions described herein with reference to the access gateways 114, 116.

Originating network 110 includes an application server (AS) 122, and terminating network 112 includes at least one of an AS 124 or a non-CCS server 126. The application servers 122, 124 can include, e.g., CCS application servers that provide CCS services such as those described above. The non-CCS server 126 can include, e.g., a telephony application server (TAS) of an IMS in a VoLTE-capable network. Terminals 102, 104 can communicate via respective access gateways 114, 116 with respective ASes 122, 124. Terminal 104 can communicate via access gateway 116 with non-CCS server 126. In some examples, WebRTC is used between terminal 102 and originating AS 122; SIP is used between originating AS 122 and terminating AS 124; and WebRTC is used between terminating AS 124 and terminal 104. Signaling path 118 is shown dashed, solely for clarity, from AS 122 via non-CCS server 126 to access gateway 116.

In the illustrated example, ASes 122 and 124 can be components of a CCS network 128. CCS network 128 can include network links and devices operated by a single carrier or CCS service provider. Additionally or alternatively, CCS network 128 can include network links and devices operated by a multiple carriers or CCS service providers, but that have been programmed with a mutual trust relationship (e.g., CCS network 128 defines a trust domain). In other examples, ASes 122 and 124 can be part of different CCS networks or trust domains.

AS 122 can communicate with AS 124 to conduct sessions between terminals 102, 104 that are both communicatively connectable with CCS network 128. AS 122 can communicate with non-CCS server 126 to conduct sessions between a terminal 102 that is communicatively connectable with CCS network 128 and a terminal 104 that is not communicatively connectable with CCS network 128, as represented by the dashed-line path. AS 122 can determine, e.g., for each session, which AS or non-CCS server to connect to.

In some examples, calls between CCS terminals 102 and 104 can be carried OTT, e.g., via packet links provisioned within CCS network 128. In some examples, represented graphically by the diagonal line with open arrowheads, calls between a CCS terminal 102 and a non-CCS terminal 104 (or vice versa) can be carried partly OTT within CCS network 128 and partly on other links, e.g., VoLTE media links provided by a 4G or 5G core or SS7 voice trunks. A media gateway (not shown) can transport media into or out of CCS network 128.

AS 122 or AS 124 can communicate with an information server 130 to retrieve information pertinent to terminal 102 or a session originated by terminal 102. For example, AS 122, 124 can retrieve CNAM information associated with a calling party from information server 130. AS 122, 124 can then add the CNAM information to a signaling message associated with the session. For example, AS 122, 124 can add the CNAM information to (or as) the value of a P-Asserted-Identity header in a SIP INVITE request. In some examples, information server 130 can be integrated into or combined with AS 122 or 124. Additionally or alternatively, an avatar, company logo, or other image or media associated with the calling party can be added to the signaling message.

AS 122, AS 124, or non-CCS server 126 can communicate with another information server 132 to retrieve information pertinent to terminal 102 or a session originated by terminal 102. For example, information server 132 can be or include a third-party CNAM information server such as those operated by NEUSTAR. Information server 132 can be a server that is not part of CCS network 128. In some examples, information server 132 is a "global CNAM server" or other information server that offers lookup services to various carriers or to the public. Information servers 130, 132 are shown in terminating network 112 merely for clarity of the diagram. Each information server 130, 132 can be part of the originating network 110, part of the terminating network 112, or separate from both originating network 110 and terminating network 112.

In some examples, signaling path 118 can carry identification information. The identification information can include at least one of: a terminal identifier such as an international mobile equipment identity (IMEI), a network identifier such as a mobile country code (MCC) and a mobile network code (MNC), a user identifier such as an international mobile subscriber identity (IMSI), a user address such as an E.164 international-dialing-plan telephone number, mobile station international subscriber directory number (MSISDN), a network address, such as an Internet IPv4 or IPv6 address, or a country code, e.g., indicating a country in which terminal 202 is located. In some examples, the identification information can include an identifier of a Mobile virtual network operator (MVNO) determined from the IMSI of terminal 102. In some examples, terminal 102 can provide the identification information during a process of attaching to a network, e.g., in an S1 Application Protocol (S1AP) Initial UE Message. In some examples, terminal 102 can provide the identification information in another message. For example, a SIP REGISTER request or a SIP INVITE request can include a P-Access-Network-Info (PANI) header. The cell global identity (CGI) of the cell (e.g., eNodeB) serving the terminal 102 can be retrieved from the "cgi-3gpp" parameter of the PANI header. The cgi-3gpp parameter can include the MCC, MNC, location area code (LAC), and cell identity (CI). Additionally or alternatively, a SIP REGISTER or INVITE can include a P-Asserted-Identity header, as noted above.

Various examples herein control the information provided to a called party based on the relationship (or lack thereof) between originating network 110 and terminating network 112. For example, information provided by information server 130 can be provided to called parties within a particular CCS tenant or CCS network 128, and information provided by information server 132 can be provided to called parties outside the particular CCS tenant or CCS network 128. The information provided can be selected to more accurately convey to the called party the identity of the caller, in a way that is pertinent to the context of the called party. This can increase the probability that the called party will answer the phone, reducing the waste of network bandwidth due to unanswered calls. Reducing the number of unanswered calls can also reduce the amount of voicemail stored, which can reduce the storage requirements of a CCS network 128 or other telecommunications network.

In some examples, information provided by information server 130 can be used to map between calling-party numbers and names instead of local contact records stored on mobile devices. This can reduce the storage requirements at the mobile devices. This can additionally reduce or remove the requirement for network bandwidth to back up contacts from a mobile device.

The terminals 102 and 104 may be implemented as any suitable mobile computing devices configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the terminals 102 and 104 as being "mobile" or "wireless," (e.g., configured to be carried and moved around), it is to be appreciated that the terminals 102 and 104 may represent various types of communication devices that are generally stationary as well, such as televisions, desktop computers, game consoles, set top boxes, and the like. User equipment can include user cellular equipment or other telecommunications or computing devices communicatively connectable with other computing devices via one or more application server(s) 122. Mobile phones and copper-loop landline phones can be examples of user equipment.

As used herein, a message "transmitted to" or "transmitted toward" a destination, or similar terms, can be transmitted directly to the destination, or can be transmitted via one or more intermediate network devices to the destination. In the illustrated example, terminal 102 transmits identification information to AS 122 via access network 106, including access gateway 114. Similarly, a message "received from" a destination can be received directly from the destination, or can be received via one or more intermediate network devices from the destination. A message passing through one or more intermediate network devices can be modified by those network devices, e.g., by adding or removing framing, or by changing a presentation of at least part of the message, e.g., from a SIP start-line to a SIP header or vice versa.

In the examples described herein, including examples described with reference to FIGS. 1-7, unless otherwise specified, individual items, e.g., physical items or data items, can be provided or operated on by any combination of the described operations. Similarly, any operation described herein can produce data not consumed by a subsequent operation.

Figure 2:
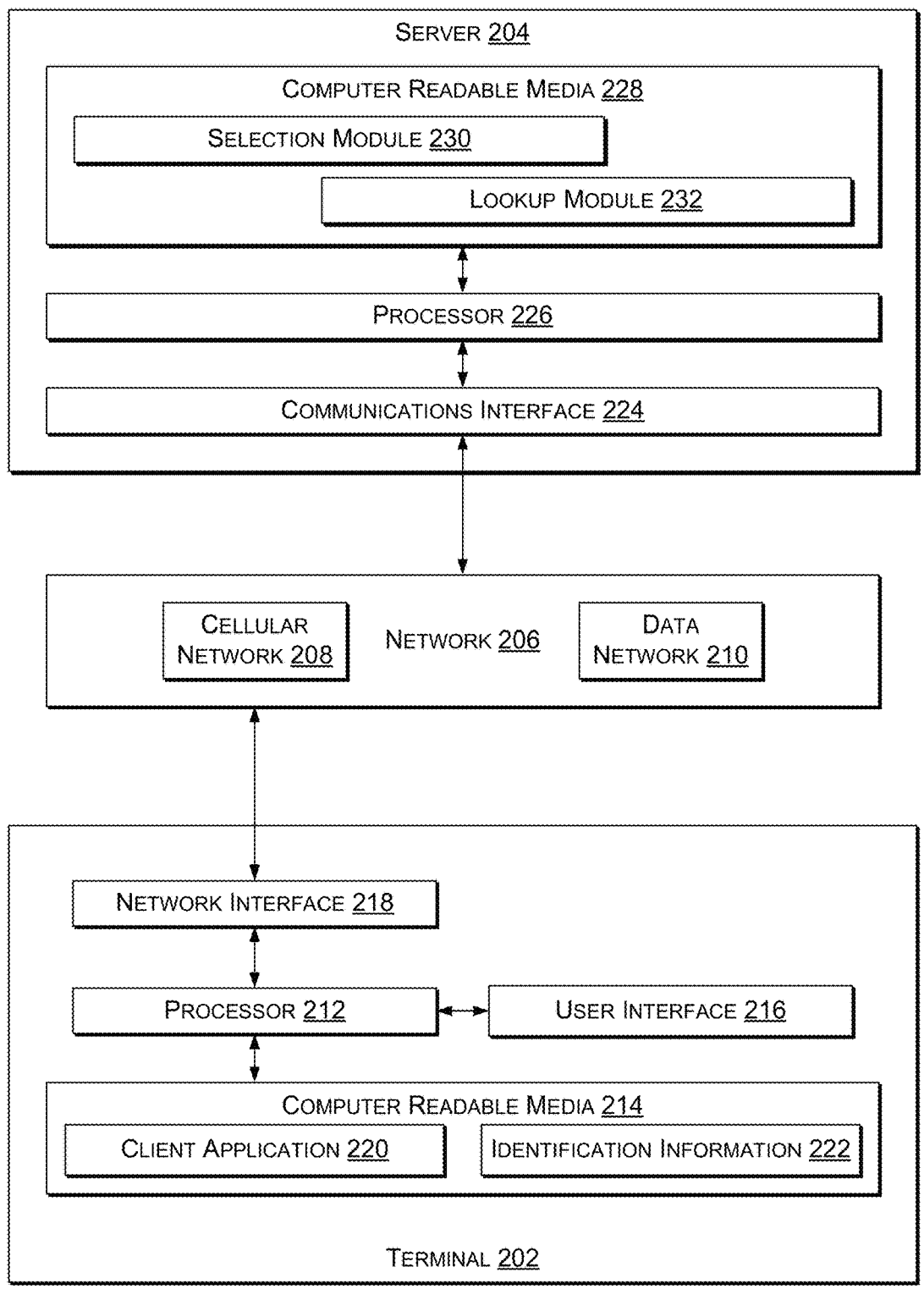
FIG. 2 is a block diagram illustrating a system that provides calling-party information control according to some implementations.

FIG. 2 is a block diagram illustrating a system 200 permitting caller-identification processing with respect to terminals according to some implementations. The system 200 includes a terminal 202, e.g., a wireless phone or other terminal such as terminal 102 or 104, FIG. 1, coupled to a server 204 via a network 206. The server 204 can represent an access gateway 114, 116, and application server 122, 124, an information server 130, or another control device or information server of a telecommunications network.

The network 206 can include one or more networks, such as a cellular network 208 and a data network 210. The network 206 can include one or more core network(s) connected to terminal(s) via one or more access network(s). Example access networks include LTE, WIFI, GSM Enhanced Data Rates for GSM Evolution (EDGE) Radio Access Network (GERAN), UTRAN, and other cellular access networks.

The cellular network 208 can provide wide-area wireless coverage using a technology such as GSM, Code Division Multiple Access (CDMA), UMTS, LTE, or the like. Example networks include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology. Communications between the server 204 and terminals such as the terminal 202 can additionally or alternatively be performed using other technologies, such as wired (Plain Old Telephone Service, POTS, or PSTN lines), optical (e.g., Synchronous Optical NETwork, SONET) technologies, and the like.

The data network 210 can include various types of networks for transmitting and receiving data (e.g., data packets), including networks using technologies such as WIFI, IEEE 802.15.1 ("Bluetooth"), Asynchronous Transfer Mode (ATM), WIMAX, and other network technologies, e.g., configured to transport IP packets. In some examples, the server 204 includes or is communicatively connected with an interworking function (IWF) or other device bridging networks, e.g., LTE, 3G, and POTS networks. In some examples, the server 204 can bridge SS7 traffic from the PSTN into the network 206, e.g., permitting PSTN customers to place calls to cellular customers and vice versa.

In some examples, the cellular network 208 and the data network 210 can carry voice or data. For example, the data network 210 can carry voice traffic using Voice over Internet Protocol (VoIP) or other technologies as well as data traffic, or the cellular network 208 can carry data packets using High Speed Packet Access (HSPA), LTE, or other technologies as well as voice traffic. Some cellular networks 208 carry both data and voice in a PS format. For example, many LTE networks carry voice traffic in data packets according to the voice-over-LTE (VoLTE) standard. Various examples herein provide origination and termination of, e.g., carrier-grade voice calls on, e.g., networks 206 using CS transports or mixed VoLTE/3G transports, or on terminals 202 including original equipment manufacturer (OEM) handsets and non-OEM handsets.

The terminal 202 can be or include a wireless phone, a wired phone, a tablet computer, a laptop computer, a wristwatch, or other type of terminal. The terminal 202 can include one or more processors 212, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media (CRM) 214, such as memory (e.g., random access memory (RAM), solid state drives (SSDs), or the like), disk drives (e.g., platter-based hard drives), another type of computer-readable media, or any combination thereof. The terminal 202 can further include a user interface (UI) 216, e.g., including an electronic display device, a speaker, a vibration unit, a touchscreen, or other devices for presenting information to a user and receiving commands from the user. The terminal 202 can further include one or more network interface(s) 218 configured to selectively communicate (wired or wirelessly) via the network 206, e.g., via an access network 106 or 108.

The CRM 214 can be used to store data and to store instructions that are executable by the processors 212 to perform various functions as described herein. The CRM 214 can store various types of instructions and data, such as an operating system, device drivers, etc. The processor-executable instructions can be executed by the processors 212 to perform the various functions described herein.

The CRM 214 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processors 212. Tangible computer-readable media can include volatile and nonvolatile, removable and non-removable media implemented in any method or technology for storage of information, such as computer readable instructions, data structures, program modules, or other data.

The CRM 214 can include processor-executable instructions of a client application 220. The client application 220, e.g., a native or other dialer, can permit a user to originate and terminate communication sessions associated with the terminal 202, e.g., a wireless phone. The client application 220 can additionally or alternatively include an SMS, RCS, or presence client, or a client of another telephony service offered by the server 204. The client application 220 can additionally or alternatively include a Web browser configured to communicate with an AS 122, 124, e.g., via WebRTC. A Web-browser client application 220 can communicate with an AS 122, 124, e.g., under control of instructions stored on CRM 214 or under control of instructions received from a Web site. For example, a user can direct a Web-browser client application 220 to visit a telephony URL (e.g., https://ccs.example.com). The client application 220 can download JAVASCRIPT or other code from the corresponding site (e.g., ccs.example.com), and carry out WebRTC or other OTT communications under control of that code.

In some examples, client application 220 is configured to receive CNAM information or other calling-party identification information. For example, client application 220 can extract this information from, e.g., an SS7 message or a P-Asserted-Identity header of a SIP INVITE request. Client application 220 can present the CNAM or other information via user interface 216, e.g., during the ringing period associated with an incoming voice call or other session-initiation request.

The CRM 214 can store information 222 identifying the terminal 202. The information 222 can include, e.g., an IMEI, an IMSI identifying the subscriber using terminal 202, or other information discussed above. The CRM 214 can additionally or alternatively store credentials (omitted for brevity) used for access, e.g., to IMS or RCS services.

In some examples, server 204 can communicate with (e.g., is communicatively connectable with) terminal 202 or other devices via one or more communications interface(s) 224, e.g., network transceivers for wired or wireless networks, or memory interfaces. Example communications interface(s) 224 can include ETHERNET or FIBRE CHAN- NEL transceivers, WIFI radios, or DDR memory-bus controllers (e.g., for DMA transfers to a network card installed in a physical server 204).

The server 204 can include one or more processors 226 and one or more CRM 228. The CRM 228 can be used to store processor-executable instructions of a selection module 230 and a lookup module 232. The processor-executable instructions can be executed by the one or more processors 226 to perform various functions described herein, e.g., with reference to FIGS. 3-7. In some examples, server 204 can be configured to, e.g., by executing the processor-executable instructions, perform functions described herein with reference to FIGS. 3-7.

In some examples, processor 212 and, if required, CRM 214, are referred to for brevity herein as a "control unit." For example, a control unit can include a CPU or DSP and instructions executable by that CPU or DSP to cause that CPU or DSP to perform functions described herein. Additionally or alternatively, a control unit can include an ASIC, FPGA, or other logic device(s) wired (physically or via blown fuses or logic-cell configuration data) to perform functions described herein. Other examples of control units can include processor 226 and, if required, CRM 228.

Illustrative Operations

Figure 3:
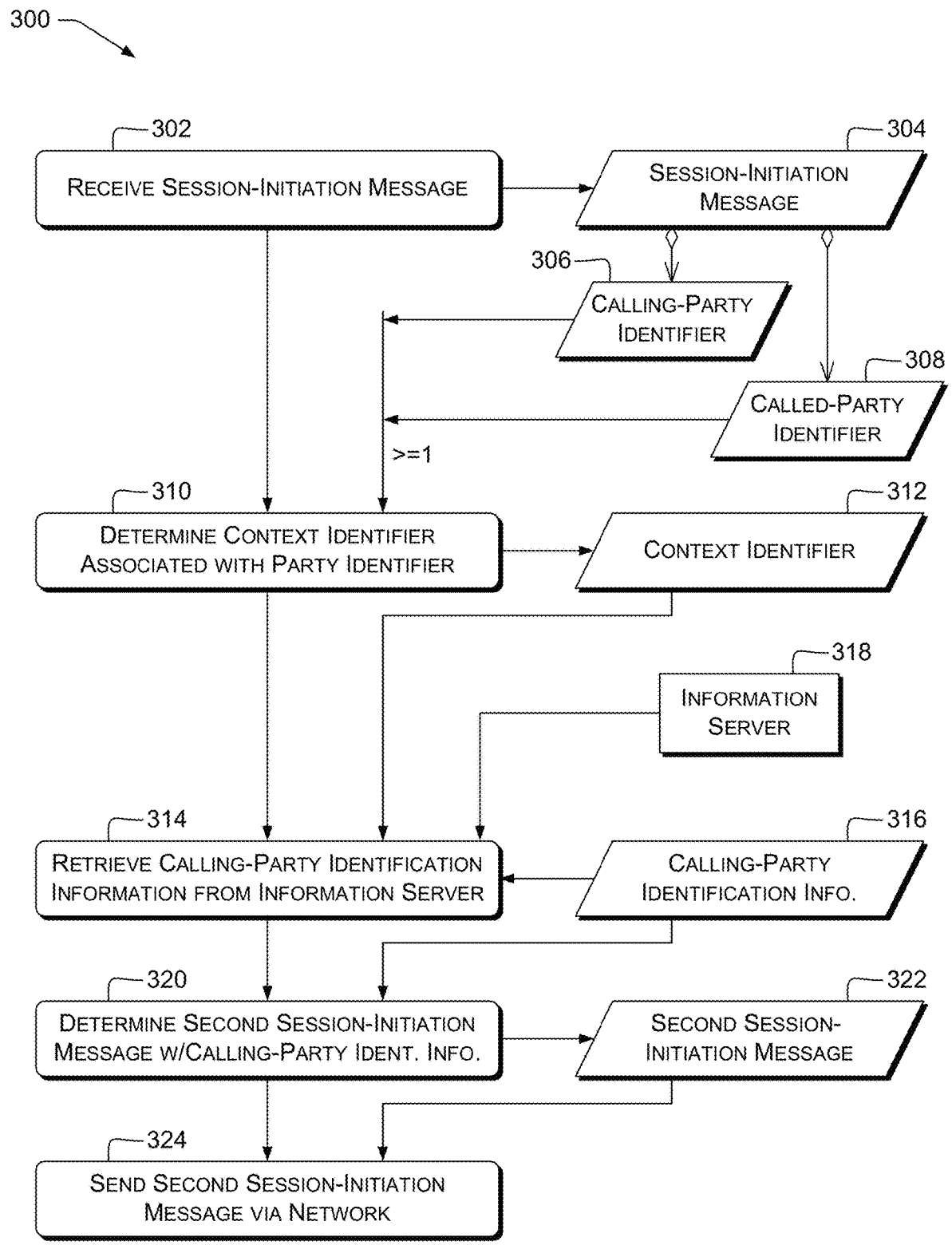
FIG. 3 illustrates an example process for controlling provision of calling-party identification information according to some implementations.

FIG. 3 is a dataflow diagram illustrating an example process 300 for controlling caller-identification information provision, and related data items. Process 300 can be performed, e.g., by a control unit of a control device of a telecommunications network 206, e.g., a control unit of the server 204 (for example, a CCS AS such as AS 122 or 124). The control device can communicate with user equipment, e.g., terminal 102, 202, of a telecommunications network 206. In some examples, the control device includes one or more processors (e.g., processor 226) configured to perform operations described below, e.g., in response to computer program instructions of the selection module 230. Process 300 (and, likewise, processes shown in FIGS. 4 and 5) can be performed by a control unit associated with originating network 110 or with terminating network 112.

Operations shown in FIG. 3 and in FIGS. 4-7, discussed below, can be performed in any order except when otherwise specified, or when data from an earlier step is used in a later step. For clarity of explanation, reference is herein made to various components shown in FIGS. 1-2 that can carry out or participate in the steps of the example method, and to various operations and messages that can occur or be transmitted while the example method is carried out or as part of the example method. It should be noted, however, that other components can be used; that is, example method(s) shown in FIGS. 3-7 are not limited to being carried out by the identified components, and are not limited to including the identified operations or messages.

At 302, the control unit can receive a session-initiation message 304 comprising a calling-party identifier 306 (associated with or indicating a calling party, e.g., terminal 102) and a called-party identifier 308 (associated with or indicating a called party, e.g., terminal 104). The session-initiation message 304 can include, e.g., a SIP INVITE or an SS7 Initial Address Message (IAM). Each of the calling-party identifier 306 and the called-party identifier 308 can include, e.g., an E.164 telephone number, an International Mobile Subscriber Identity (IMSI) value, a Global Title value, or a SIP Uniform Resource Identifier (URI) (for brevity throughout, reference to SIP URIs also include Secure SIP, SIPS, URIs).

At 310, the control unit can determine a context identifier 312 associated with at least one (">0") of the calling-party identifier 306 and the called-party identifier 308. For example, context identifier 312 can indicate whether the calling party and the called party are both associated with a common communication-service tenant (e.g., a CCS tenant), or otherwise whether the calling party should be considered an internal or external party from the point of view of the called party. The context identifier can include a Boolean value, integer, flag, or other type of value. Examples are discussed herein, e.g., with reference to FIGS. 4, 5, and 7.

In some examples, the control unit can determine the context identifier 312 based on both the calling-party identifier 306 and the called-party identifier 308. For example, the control unit can compare E.164 country codes, exchange numbers (e.g., North American Numbering Plan, NANP, "NXX" central-office codes), or other prefixes; MCCs, MNCs, or MCC/MNC pairs; domains in a SIP start line, To header, or From header; or other parts of the identifiers 306, 308. If the calling-party identifier 306 matches the called-party identifier 308, with respect to the prefix or other portion compared, the control unit can determine the context identifier 312 indicating that the calling party and the called party are both associated with a common communication-service tenant.

At 314, the control unit can retrieve calling-party identification information 316 from an information server 318 based at least in part on the calling-party identifier 306 and the context identifier 312. The calling-party identification information 316 can include, e.g., CNAM information or other information that is human-readable or that is otherwise designed for presentation to human users. The other information can include, e.g., an avatar, company logo, or other image or media associated with the calling party. Information server 318 can be or represent, e.g., information server 130 or 132.

In some examples, the control unit can perform an SS7 Transaction Capabilities Application Part (TCAP) Name Query to a predetermined CNAM database, and receive the calling-party identification information 316 from the CNAM database in a TCAP response. The calling-party identification information 316 can include a CNAM string, a name, an address, a company, or other human- or machine-readable identification information. In some examples, the calling-party identification information 316 includes a text string in a predetermined character set, e.g., ASCII or UNICODE in the UTF-8 encoding or other encodings. Examples are discussed herein, e.g., with reference to operations 406, 410, 502, and 506, and FIGS. 6-7.

In some examples, the control unit can communicate with information server 318 using the Diameter protocol, e.g., over the Sh interface (3GPP TS 29.329). For example, a network access identifier (NAI) of the calling party or of the called party can be carried in a User-Name attribute-value pair (AVP) or in other AVPs, e.g., defined in RFC 3588 or other IETF or 3GPP standards, or can be carried in vendor-defined AVPs.

At 320, the control unit can determine a second session-initiation message 322 comprising the calling-party identification information 316 based at least in part on the session-initiation message 304. For example, the control unit can add the calling-party identification information 316 to a SIP start-line, or to or as the value of a From or P-Asserted-Identity ("PAI") header. The control unit can replace existing information in a start-line, header, or other portion of the first session-initiation message 304, or can add the calling-party identification information 316 to or alongside existing values. In some examples, the control unit can add the calling-party identification information 316 as an additional part in a MIME multipart body, or can add a MIME multipart body containing a part holding the calling-party identification information 316. For example, the part can include text, image, video, sound, or other media data of the calling-party identification information 316. In some examples, the control unit can add a header (e.g., a SIP P-header or other header), feature tag, or other protocol element carrying a URI of the calling-party identification information 316. The URI can include, e.g., an https or other URL linking to the calling-party identification information 316, or a data URL embedding the calling-party identification information 316, e.g., base64-encoded.

In some examples, the second session-initiation message 322 comprises a Session Initiation Protocol (SIP) message, e.g., a SIP INVITE request. The SIP message can include a PAI header having a value. The value of the PAI header can be the calling-party identification information 316 (e.g., value "Mike <sip:oldfield@example.com>" in the PM header "P-Asserted-Identity: Mike <sip:oldfield@example.com>").

At 324, the control unit can send the second session-initiation message 322 via the telecommunications network 206. For example, the control unit can send the second session-initiation message 322 via TCP, or can transmit the second session-initiation message 322 including the calling-party identification information 316 over SS7 or via an analog line (e.g., using Bell 202 or other modulation techniques).

In some examples, operations 302-324 are performed at originating AS 122. Session-initiation message 304 can be, e.g., a SIP INVITE from access gateway 114, and second session-initiation message 322 can be a SIP INVITE to terminating AS 124 or non-CCS server 126. Some of these examples can be used, e.g., to provide domain-specific CNAM information or other calling-party identification information 316 to IMS or PSTN customers via non-CCS server 126 without requiring that non-CCS server 126 be modified to retrieve CCS-specific information. In other examples, operations 302-324 are performed at terminating AS 124. Session-initiation message 304 can be, e.g., a SIP INVITE from originating AS 122, and second session-initiation message 322 can be a SIP INVITE to terminating access gateway 116.

Figure 4:
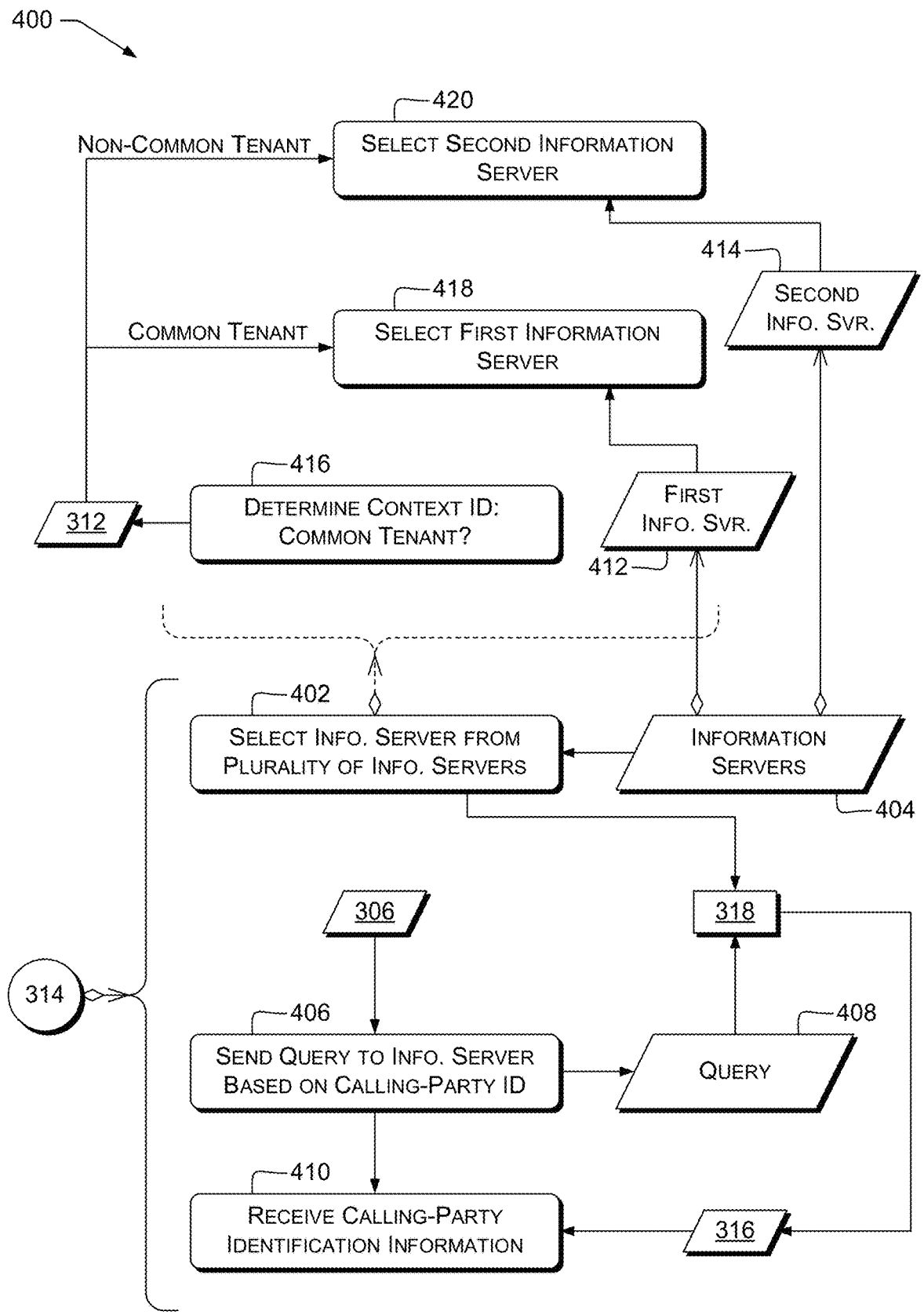
FIG. 4 illustrates example processes for selecting information servers and retrieving calling-party information from servers according to some implementations.

FIG. 4 is a dataflow diagram illustrating example processes 400 for controlling caller-identification information provision, and related data items. Processes 400 can be performed, e.g., by a control unit of a control device, e.g., a control unit of the server 204, e.g., in response to computer program operations of the selection module 230. In some examples, operation 314 can include operation 402, operations 406 and 410, or operations 402-410. In some examples, operation 402 can include operations 416, 418, and 420.

At 402, the control unit can select the information server 318 from a plurality 404 of information servers (or, in some examples, a group of one or more information server(s)) based at least in part on the context identifier 312. This can be done before retrieving the calling-party identification information 316. The plurality 404 of information servers can include information server 318. In some examples such as that shown, the control unit can select data indicating information server 318 from data indicating the plurality 404 of information servers. Examples of server selection are discussed below with reference to operations 416-420. In some examples, operation 402 can be followed by operation 406.

At 406, the control unit can send a query 408 to the information server 318 based at least in part on the calling-party identifier 306. For example, query 408 can include a TCAP Name Query or other query described herein with reference to operation 314. In some examples, query 408 can include an identifier or a value that maps directly to the identifier, such as an E.164 number that maps uniquely to a SIP tel: URI included in the session-initiation message 304.

At 410, the control unit can receive the calling-party identification information 316 from the information server 318 in response to the query 408. Examples are discussed herein, e.g., with reference to operation 314.

Some examples herein select one of two information servers to handle query 408, e.g., an internal information server 130 or an external information server 132. In some of these examples, (data indicating) the plurality 404 of information servers comprises (data of) a first information server 412 and a second information server 414.

At 416, the control unit can determine the context identifier 312 indicating whether the calling-party identifier 306 and the called-party identifier 308 are both associated with a common communication-service tenant, e.g., a common CCS tenant. For example, the control unit can determine whether the calling-party identifier 306 and the called-party identifier 308 are both within a range associated with a particular CCS tenant. The range can be stored, e.g., in a database or other CRM 228. Although operation 416 is shown as part of operation 314, operation 416 can additionally or alternatively be part of operation 310.

In some examples, the calling-party identifier 306 and the called-party identifier 308 can be SIP URIs of the form "user@domain". The control unit can extract the "domain" part of each identifier 306, 308, e.g., using substring extraction or regex matching with capturing groups. The control unit can determine that the identifiers 306, 308 are both associated with a common communication-service tenant if the domain parts of the identifiers 306, 308 match, and that the identifiers 306, 308 are not both associated with a common communication-service tenant otherwise. In some examples, the control unit can extract and compare only a portion of the domain part, e.g., the second-level and top-level domains (matching /[a-zA-Z0-9-]+\.[a-zA-Z0-9-]+$/ (e.g., "tmobile.com" from the domain "us.tmobile.com"), or only the second-level domain (e.g., "tmobile").

At 418, the control unit can select the first information server 412 as the information server 318 in response to the context identifier 312 indicating that the calling-party identifier 306 and the called-party identifier 308 are both associated with a common communication-service tenant ("common tenant"). For example, the control unit can load a network name or address of the first information server 412 into a storage area in CRM 228 designating the information server 318.

At 420, the control unit can select the second information server as the information server 318 in response to the context identifier 312 indicating that the calling-party identifier 306 and the called-party identifier 308 are not both associated with a common communication-service tenant ("non-common tenant"). Examples are discussed herein, e.g., with reference to operation 418.

Figure 5:
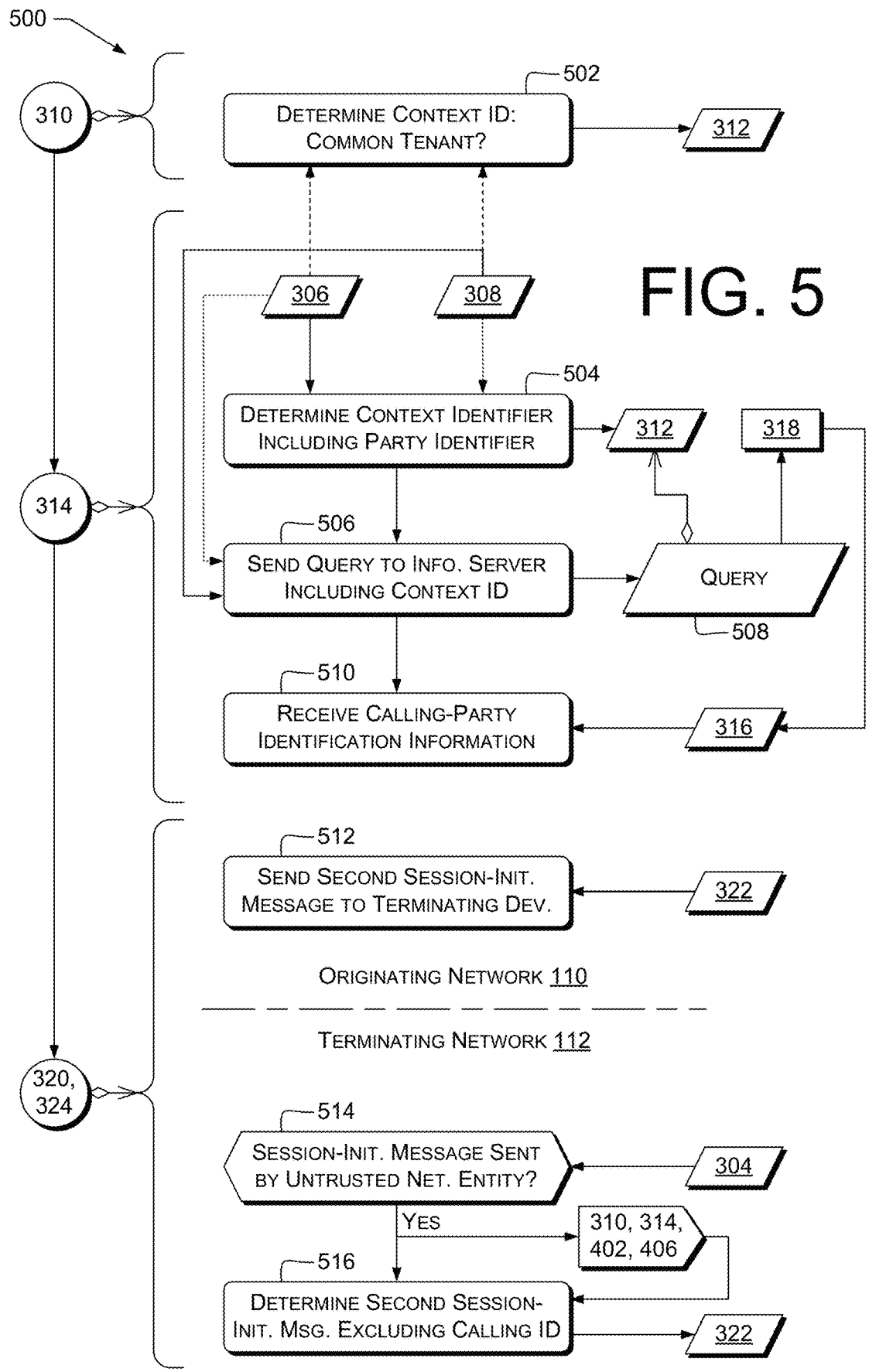
FIG. 5 illustrates example processes for selecting information servers, retrieving calling-party information, and controlling provision of calling-party information according to some implementations.

FIG. 5 is a dataflow diagram illustrating example processes 500 for controlling caller-identification information provision, and related data items. Processes 500 can be performed, e.g., by a control unit of a control device, e.g., a control unit of the server 204, e.g., in response to computer program operations of the selection module 230. In some examples, operation 310 can include operation 502; operation 314 can include operation 504; operation 314 can include operations 506 and 510; operation 314 can include operations 504-510; operation 324 can include operation 512; or operations 514 and 516 can be included in one of, or spread between, operations 320 and 324. In some examples, operations 302, 514, 516, and 324, or 302, 514, 314, 516, and 324 can be performed at a terminating AS 124 or non-CCS server 126 independently of other operations shown in FIGS. 3 and 5.

At 502, the control unit can determine the context identifier 312 indicating whether the calling-party identifier 306 and the called-party identifier 308 are both associated with a common communication-service tenant. Examples are discussed herein, e.g., with reference to operation 310 or 416. Operation 502 can be performed without operation 402, in some examples.

At 504, the control unit can determine the context identifier 312 comprising one of the called-party identifier 308 and the calling-party identifier 306. The query can include the other of the called-party identifier 308 and the calling-party identifier 306. In some examples, represented with solid lines, context identifier 312 includes calling-party identifier 306 and query 508, discussed below, includes called-party identifier 308. In other examples, represented with stippled lines, context identifier 312 includes called-party identifier 308 and query 508 includes calling-party identifier 306. In some examples, operation 504 is followed by operation 506.

At 506, the control unit can send a query 508 to the information server 318 based at least in part on the calling-party identifier 306. Examples are discussed herein, e.g., with reference to operation 406 and query 408. Query 508 can include context identifier 312. The context identifier 312 included in query 508 can be a context identifier 312 determined in various ways, e.g., as discussed herein with reference to operations 310, 416, 502, or 504, in various examples.

At 510, the control unit can receive the calling-party identification information 316 from the information server 318 in response to the query 508. Examples are discussed herein, e.g., with reference to operation 410. In some examples using operation 402, the control unit sends a query 408 to an information server 318 selected based on the context identifier 312. By contrast, in some examples using operations 506 and 510, the control unit sends the query 508 to the same information server 318 regardless of the context identifier 312. The information server 318 then determines the appropriate calling-party identification information 316.

At 512, the control unit can send the second session-initiation message 322 to a terminating control device via the telecommunications network 206. The terminating control device can be, e.g., terminating AS 124. In some examples using operation 512, any of operations 302-324, 402-420, and 512 can be performed at an originating AS, e.g., originating AS 122, but this is not limiting. In some examples, the calling-party identifier 306 is associated with a terminal 102 with which the control unit (e.g., of originating AS 122) is communicatively connectable.

In some examples, operations 502-512 are performed at originating AS 122 to determine information that will be provided to terminating AS 124 or non-CCS server 126. In other examples, operations 502-510 are performed at terminating AS 124 to determine information that will be provided to terminal 104, e.g., via access gateway 116. In some examples, operations 514 and 516 are performed at terminating AS 124 to control information that will be provided to terminal 104, e.g., via access gateway 116. In some examples, the called-party identifier 306 is associated with a terminal 104 with which the control unit (e.g., of terminating AS 124) is communicatively connectable.

At 514, the control unit can determine that the session-initiation message 304 was sent by an untrusted network entity. In some examples, operation 514 (and operation 516, below) can be performed at a terminating AS 124 or other component of a terminating network 112, as shown, but this is not limiting. In some examples, the control unit is configured to trust any network entity, so the determination at operation 514 can be that operation 516 should not be performed.

The untrusted network entity can be, e.g., an originating AS 122 or other AS or network node or device lacking an established trust relationship or common trust domain with the control unit. In some examples, the control unit is operated by a first carrier and the untrusted network entity is operated by a second, different carrier. Operation 514 can include searching a database or other datastore for a network address or name of the network entity from which the session-initiation message 304 was received. Operation 514 can be followed by operation 516.

In some examples, if the session-initiation message 304 was sent by an untrusted network entity, operation 514 can be followed by at least one of operations 310, 314, 402, or 406 to retrieve alternative calling-party identification information 316 from a trusted network entity or neutral network entity, e.g., information server 132, or to otherwise determine alternative calling-party identification information 316. Operation 310, 314, 402, or 406 can then be followed by operation 516 or other operations represented by operations 320 or 324.

At 516, the control unit can determine the second session-initiation message 322 excluding the calling-party identifier 306. This can be done by removing a header or header value from the second session-initiation message 322, e.g., removing a PAI header or PAI-header value. Additionally or alternatively, the calling-party identifier 306 can be removed from a SIP start-line or other component of the first session-initiation message 304 to provide the second session-initiation message 322.

Operations 514 and 516 are shown as occurring in terminating network 112 (e.g., AS 124) for brevity of explanation. Additionally or alternatively, operations 514 and 516 can be performed in originating network 110 (e.g., AS 122). In some examples, AS 122 may not know, at the time of performing operation 314, which information server 130, 132 will ultimately respond (e.g., due to request proxying or multihoming of information servers 130, 132). Therefore, in some examples, when the originating AS 122 receives the calling-party identification information 316, the originating AS 122 may perform operations 514 and, if the source of information 316 is an untrusted network entity, operation 516. In some examples, if the information 316 is provided by an untrusted network entity, originating AS 122 may repeat operations 310 and 314 with respect to a different network entity, e.g., a known information server 130, 132.

Some examples of FIGS. 3-5 control the calling-party identification information 316 provided to terminal 104 in various ways. The following discussion lists nonlimiting examples.

In some examples, terminal 102 sends a session-initiation message to access gateway 114. The session-initiation message can be a SIP INVITE, a WebRTC or other message over HTTP, or another type of message. The session can be, e.g., a voice or video call. The access gateway 114 can send the session-initiation message (possibly modified) to the originating AS 122, e.g., a Call Application Server (CAS) or other CCS server. In some examples, the access gateway 114 interworks WebRTC, facing terminal 102, with SIP, facing originating AS 122.

The originating AS 122 receives the session-initiation message 304 at operation 302. The originating AS 122 can then retrieve determine the context identifier 312 (operation 310), e.g., indicating whether terminal 104 is an internal-domain (e.g., within-tenant) or external-domain (outside-tenant) terminal with respect to terminal 102. The originating AS 122 can then request CNAM information or other calling-party identification information 316 from a single information server 318, e.g., information server 130, that is responsive to the context identifier 312 (e.g., operations 314, 406, 410, 506, or 510) or from an information server 318, e.g., one of information server 130 or 132, selected based at least in part on the context identifier 312 (e.g., operations 314, 402, and 416-420). In some examples, the resulting calling-party identification information 316 can include a domain or group name for external-domain called parties and can exclude the domain or group name for internal-domain called parties.

The originating AS 122 can add or modify a P-Asserted-Identity header in a SIP INVITE to include the calling-party identification information 316, or can otherwise add the calling-party identification information 316 to a second session-initiation message 322 (operation 320). The originating AS 122 can then send the second session-initiation message 322 to a terminating AS (e.g., a CAS), e.g., terminating AS 124 or non-CCS server 126 (operations 324, 512).

The originating-side second session-initiation message 322 sent by originating AS 122 can be the terminating-side session-initiation message 304 received by terminating AS 124. The terminating AS 124 can determine whether the terminating-side session-initiation message 304 was sent by (or was received from) an untrusted network entity (operation 514). If so, the terminating AS 124 can remove the calling-party identification information 316 from the originating-side session-initiation message 304 before sending a corresponding terminating-side second session-initiation message 322 to terminal 104, or can send the corresponding terminating-side second session-initiation message 322 to terminal 104 without the calling-party identification information 316 from the originating-side session-initiation message 304 (operation 516).

In some examples, in response to the terminating-side session-initiation message 304 being sent by (or received from) an untrusted network entity, the terminating AS 124 can query a global CNAM database or other information server 132 (operation 314 following operation 514). The terminating AS 124 can then determine the terminating-side second session-initiation message 322 based at least in part on information retrieved from the information server 132. In some examples, the information server 132 is provisioned with a CNAM or other identification record including a domain part (e.g., "@example.com").

The terminating AS 124 can then send the terminating-side second session-initiation message 322 to terminal 104, e.g., via access gateway 116. If terminating AS 124 trusts originating AS 122, the terminating-side second session-initiation message 322 can include the calling-party identification information 316 added by originating AS 122 to the originating-side second session-initiation message 322 at operation 320. Otherwise, the terminating-side second session-initiation message 322 can omit calling-party identification information 316, or can include the calling-party identification information 316 determined by terminating AS 124 (e.g., operations 314 or 320 on the terminating AS 124). Terminal 104 can then present the calling-party identification information 316, e.g., via user interface 216.

Figure 6:
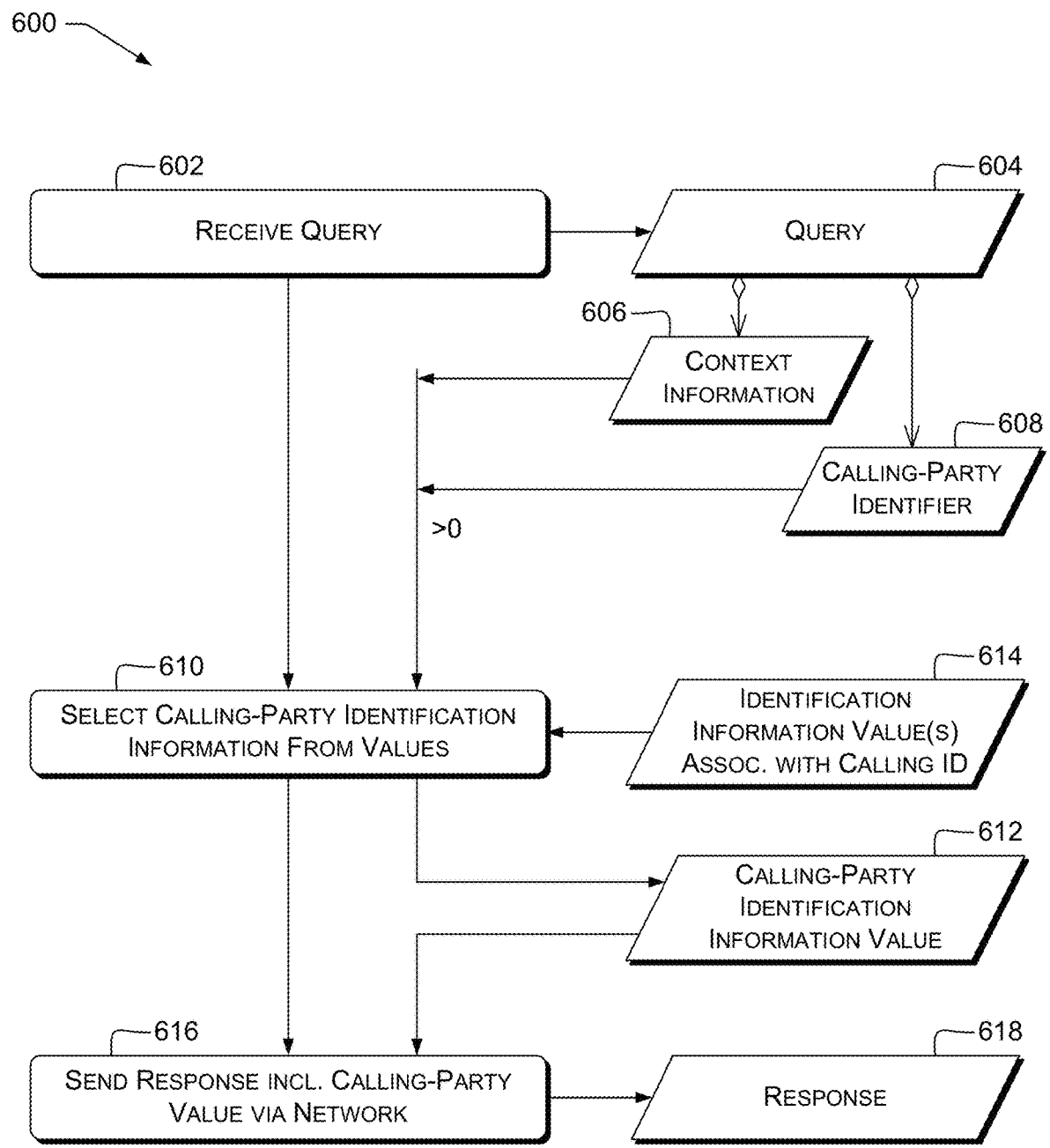
FIG. 6 illustrates an example process for providing calling-party information according to some implementations.

FIG. 6 is a dataflow diagram illustrating an example process 600 for controlling caller-identification information provision, and related data items. Process 600 can be performed, e.g., by a control unit of a control device of a telecommunications network 206, e.g., a control unit of the server 204 (for example, an information server such as information server 130, 318 in CCS network 128). The control device can communicate with ASes 122, 124 in some examples. In some examples, the core network device includes one or more processors (e.g., processor 226) configured to perform operations described below, e.g., in response to computer program instructions of the lookup module 232.

At 602, the control unit can receive, via a telecommunications network, a query 604 comprising context information 606 and indicating a calling-party identifier 608. Examples are discussed herein, e.g., with reference to operation 406 or 506. Query 604 can represent query 408 or 508. Context information 606 can represent or include context identifier 312. Calling-party identifier 608 can represent calling-party identifier 306.

At 610, the control unit can select, based at least in part on the context information 606, a calling-party identification information value 612 of a group 614 of one or more party identification information values (e.g., a plurality of party identification information values). The group 614 of party identification information values can be values associated with the calling-party identifier 608. Examples are discussed herein, e.g., with reference to FIG. 7. Additionally or alternatively, the control unit can select, from a group 614 of media items, a media item associated with the calling party (e.g., an avatar, company logo, or other still or moving image or sound).

At 616, the control unit can send, via telecommunications network 206, a response 618 comprising the calling-party identification information value 612. Examples are discussed herein, e.g., with reference to operations 314, 410, or 506. Response 618 can include, e.g., a TCAP response, a SIP response, or a response in another protocol.

FIG. 7 is a dataflow diagram illustrating example processes 700 for controlling caller-identification information provision, and related data items. Processes 700 can be performed, e.g., by a control unit of a control device, e.g., a control unit of the server 204 (for example, an information server such as information server 130, 318), e.g., in response to computer program operations of the lookup module 232. In some examples, operation 602 is preceded by operations 702 and 708. In some examples, operation 610 is preceded by, or includes, operation 718. In some examples, operation 610 includes operation 712. In some examples, operation 610 includes operations 712 and 714.

At 702, the control unit can receive, via a user interface, a provisioning calling-party identifier 704 and a group 706 of one or more provisioning party identification information values (e.g., a plurality of provisioning party identification information values). The provisioning calling-party identifier 704 can be an E.164 number or any other form of party identification discussed herein. The group 706 of provisioning party identification information values can include, e.g., internal-domain and external-domain CNAM values. In some examples, operation 702 can include receiving the provisioning calling-party identifier 704 and the group 706 of values via a user interface 216, e.g., via a Web interface.

At 708, the control unit can store the group 706 of provisioning party identification information values in association with the provisioning calling-party identifier 704 in the one or more computer-readable media, e.g., CRM 228.

In some examples, the control unit can select the calling-party identification information value 612 based on a context identifier 710, which can represent context identifier 312. The context identifier 710 can be included in the context information 606, or can be determined based at least in part on the context information 606, as discussed below.

At 712, the control unit can select the calling-party identification information value 612 denoted by the context identifier 710. In some examples in which the context information 606 includes the context identifier 710, operation 712 can be used without operation 714, discussed below. In some of these examples, the calling-party identifier 608 is selected from the group consisting of: an E.164 telephone number, an IMSI value, a Global Title value, and a SIP URI.

In some examples, the context identifier 710 is an index into a table or other data structure associated with the calling-party identifier 608. For example, context identifier 710 can include an enumerated value (e.g., a Boolean, a numeric 0/1, a flag, or a string from a set of strings, e.g., "internal" and "external") indicating whether to use, e.g., an internal-domain calling-party identification information value 612 or an external-domain calling-party identification information value 612. In some examples, the context identifier 710 is used directly to index into a database or table associated with the calling-party identifier. In other examples, a pure function is applied to the context identifier 710 to determine the database or table index.

At 714, the control unit can determine the context identifier 710 indicating whether the calling-party identifier 608 and a called-party identifier 716 are both associated with a common communication-service tenant. The called-party identifier 716 can be included in the context information 606. Examples are discussed herein, e.g., with reference to operation 416. Operation 714 can be followed by operation 712, at which the control unit can select the calling-party identification information value denoted by the context identifier.

At 718, the control unit of one information server can retrieve at least one of the group 614 of party identification information values from another information server. Operation 718 can be performed before (as shown) or as part of operation 610. For example, the other information server can be a global CNAM server.

In some examples of operation 718, the control unit of information server 130 can determine that the context information 606 indicates that external-domain CNAM information should be provided. The control unit of information server 130 can determine a second query based at least in part on query 604. The second query can, e.g., include calling-party identifier 608 or exclude context information 606. The control unit of information server 130 can then send the second query to information server 132, receive a response from information server 132, and extract the calling-party identification information value 612 from the response. In some examples in which operation 718 precedes operation 610, operation 610 can include selecting, as the calling-party identification information value 612, the one of the group 614 of party identification information values returned by information server 132.

Example Clauses

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A method comprising, by a control device of a telecommunications network: receiving a session-initiation message comprising a calling-party identifier and a called-party identifier; determining a context identifier associated with at least one of the calling-party identifier and the called-party identifier; retrieving calling-party identification information from an information server based at least in part on the calling-party identifier and the context identifier; determining a second session-initiation message comprising the calling-party identification information based at least in part on the session-initiation message; and sending the second session-initiation message via the telecommunications network.

B: The method according to paragraph A, further comprising: before retrieving the calling-party identification information, selecting the information server from a plurality of information servers based at least in part on the context identifier, wherein the plurality of information servers comprises the information server; sending a query to the information server based at least in part on the calling-party identifier; and receiving the calling-party identification information from the information server in response to the query.

C: The method according to paragraph B, wherein: the plurality of information servers comprises a first information server and a second information server; and the method further comprises: determining the context identifier indicating whether the calling-party identifier and the called-party identifier are both associated with a common communication-service tenant; selecting the first information server as the information server in response to the context identifier indicating that the calling-party identifier and the called-party identifier are both associated with a common communication-service tenant; and selecting the second information server as the information server in response to the context identifier indicating that the calling-party identifier and the called-party identifier are not both associated with a common communication-service tenant.

D: The method according to any of paragraphs A-C, further comprising: sending a query to the information server based at least in part on the calling-party identifier, the query comprising the context identifier; and receiving the calling-party identification information from the information server in response to the query.

E: The method according to paragraph D, further comprising determining the context identifier comprising one of the called-party identifier and the calling-party identifier, wherein the query comprises the other of the called-party identifier and the calling-party identifier.

F: The method according to any of paragraphs A-E, further comprising determining the context identifier based on both the calling-party identifier and the called-party identifier.

G: The method according to any of paragraphs A-F, further comprising determining the context identifier indicating whether the calling-party identifier and the called-party identifier are both associated with a common communication-service tenant.

H: The method according to any of paragraphs A-G, wherein: the second session-initiation message comprises a Session Initiation Protocol (SIP) message; the SIP message comprises a P-Asserted-Identity header having a value; the value of the P-Asserted-Identity header is the calling-party identification information; and the method further comprises sending the second session-initiation message to a terminating control device via the telecommunications network.

I: The method according to any of paragraphs A-H, further comprising: determining that the session-initiation message was sent by an untrusted network entity; in response, determining the second session-initiation message excluding the calling-party identifier.

J: A control device of a telecommunications network, the control device comprising: a communications interface communicatively connectable with a terminal of the telecommunications network; and a control unit communicatively connected with the communications interface and configured to perform operations comprising: receiving a session-initiation message comprising a calling-party identifier and a called-party identifier; determining a context identifier associated with at least one of the calling-party identifier and the called-party identifier; retrieving calling-party identification information from an information server via the telecommunications network based at least in part on the calling-party identifier and the context identifier; determining a second session-initiation message comprising the calling-party identification information based at least in part on the session-initiation message; and sending the second session-initiation message via the telecommunications network.

K: The control device according to paragraph J, the operations further comprising: before retrieving the calling-party identification information, selecting the information server from a plurality of information servers based at least in part on the context identifier, wherein the plurality of information servers comprises the information server; sending a query to the information server via the telecommunications network based at least in part on the calling-party identifier; and receiving the calling-party identification information from the information server via the telecommunications network.

L: The control device according to paragraph J or K, the operations further comprising: sending a query to the information server, the query comprising the context identifier; and receiving the calling-party identification information from the information server in response to the query; wherein the context identifier comprises one of the called-party identifier and the calling-party identifier and the query comprises the other of the called-party identifier and the calling-party identifier.

M: The control device according to any of paragraphs J-L, wherein: the calling-party identifier is associated with the terminal; the second session-initiation message comprises a Session Initiation Protocol (SIP) message; the SIP message comprises a P-Asserted-Identity header having a value; the value of the P-Asserted-Identity header is the calling-party identification information; and the operations further comprise sending the second session-initiation message to a terminating control device via the telecommunications network.

N: The control device according to any of paragraphs J-M, wherein the called-party identifier is associated with the terminal, the operations further comprising: determining that the session-initiation message was sent by an untrusted network entity; in response, determining the second session-initiation message excluding the calling-party identifier.

O: One or more computer-readable media comprising instructions that, when executed by at least one processor, cause the at least one processor to perform operations comprising: receiving, via a telecommunications network, a query comprising context information and indicating a calling-party identifier; selecting, based at least in part on the context information, a calling-party identification information value of a group of party identification information value(s), the group of party identification information value(s) associated with the calling-party identifier; and sending, via the telecommunications network, a response comprising the calling-party identification information value.

P: The one or more computer-readable media according to paragraph O, wherein: the context information comprises a context identifier; the calling-party identifier is selected from the group consisting of: an E.164 telephone number, an International Mobile Subscriber Identity (IMSI) value, a Global Title value, and a Session Initiation Protocol (SIP) Uniform Resource Identifier (URI); and the operations include selecting the calling-party identification information value denoted by the context identifier.

Q: The one or more computer-readable media according to claim P, the operations further comprising determining an index by applying a predetermined mapping function to the context identifier; and selecting the party identification information value associated with the index in the group of party identification information values.

R: The one or more computer-readable media according to any of paragraphs O-Q, wherein: the context information comprises a called-party identifier; and the operations further comprise: determining a context identifier indicating whether the calling-party identifier and the called-party identifier are both associated with a common communication-service tenant; and selecting the calling-party identification information value denoted by the context identifier.

S: The one or more computer-readable media according to any of paragraphs O-R, the operations further comprising: receiving, via a user interface, a provisioning calling-party identifier and a group of provisioning party identification information value(s); and storing the group of provisioning party identification information value(s) in association with the provisioning calling-party identifier in the one or more computer-readable media.

T: The one or more computer-readable media according to any of paragraphs O-S, the operations further comprising, before selecting the calling-party identification information value, retrieving at least one of the group of party identification value(s) from an information server via the telecommunications network.

U: The one or more computer-readable media according to any of paragraphs O-T, wherein the group of party identification information value(s) comprises a plurality of party identification information values.

V: A method comprising: receiving (292) a session initiation-message (294); determining (504) that the session-initiation message was sent by an untrusted network entity; and determining (506) a second session-initiation message (312) that excludes calling-party identification information (306) that was included in the session initiation-message.

W: The method according to paragraph V, further comprising sending (314) the second session-initiation message (312) via a network.

X: The method according to paragraph V or W, further comprising, after determining (504) that the session-initiation message was sent by an untrusted network entity, retrieving (708) second calling-party identification information from an information server (e.g., KR); and determining the second session-initiation message (312) comprising the second calling-party identification information.

Y: A computer-readable medium, e.g., a computer storage medium, having thereon computer-executable instructions, the computer-executable instructions upon execution configuring a computer to perform operations as any of paragraphs A-I, J-N, O-U, or V-X recites.

Z: A device comprising: a processor; and a computer-readable medium, e.g., a computer storage medium, having thereon computer-executable instructions, the computer-executable instructions upon execution by the processor configuring the device to perform operations as any of paragraphs A-I, J-N, O-U, or V-X recites.

AA: A system comprising: means for processing; and means for storing having thereon computer-executable instructions, the computer-executable instructions including means to configure the system to carry out a method as any of paragraphs A-I, J-N, O-U, or V-X recites.

AB: A computer-readable medium, e.g., a computer storage medium, having thereon computer-executable instructions, the computer-executable instructions upon execution configuring a computer to perform operations as any of paragraphs A-I, J-N, O-U, or V-X recites.

AC: A device comprising: a processor; and a computer-readable medium, e.g., a computer storage medium, having thereon computer-executable instructions, the computer-executable instructions upon execution by the processor configuring the device to perform operations as any of paragraphs A-I, J-N, O-U, or V-X recites.

AD: A system comprising: means for processing; and means for storing having thereon computer-executable instructions, the computer-executable instructions including means to configure the system to carry out a method as any of paragraphs A-I, J-N, O-U, or V-X recites.

AE: A network terminal configured to perform operations as any of paragraphs A-I, J-N, O-U, or V-X recites.

AF: A network control device configured to to perform operations as any of paragraphs A-I or J-N recites.

AG: An information server configured to perform operations as any of paragraphs O-U or V-X recites.

Conclusion

Various aspects described above permit providing context-dependent caller-identification information to called terminals. Various aspects permit non-CCS capped parties to benefit from CCS-aware caller-identification information determination. As discussed above, technical effects of various examples can include controlling bandwidth usage, reducing network load, and increasing network reliability.

Example components FIGS. 1 and 2, example data exchanges in FIGS. 3-7, example process blocks in FIGS. 3-7, and other methods, processes, or operations described above can be embodied in, and fully automated via, hardware, firmware, or software code modules embodied in or executed by one or more computers, processors, or other control units. As used herein, the term "module" is intended to represent example divisions of the described operations for purposes of discussion, and is not intended to represent any type of requirement or required method, manner or organization. Therefore, while various "modules" are discussed herein, their functionality and/or similar functionality can be arranged differently (e.g., combined into a smaller number of modules, broken into a larger number of modules, etc.). In some instances, the functionality and/or modules discussed herein may be implemented as part of a computer operating system (OS). In other instances, the functionality and/or modules may be implemented as part of a device driver, firmware, application, or other software subsystem. Software implementing the techniques described above can be distributed on various types of computer-readable media, not limited to the forms of memory that are specifically described.

Example computer-implemented operations described herein can additionally or alternatively be embodied in specialized computer hardware, e.g., FPGAs. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

Many variations and modifications can be made to the above-described examples, the elements of which are to be understood as being among other acceptable examples. All such modifications and variations are intended to be included herein within the scope of this disclosure and protected by the claims. For example, structures or operations described with respect to a single server or device can be performed by each of multiple devices, independently or in a coordinated manner, except as expressly set forth herein. Similarly, although some features and examples herein have been described in language specific to structural features and/or methodological steps, it is to be understood that the appended claims are not necessarily limited to the specific features or steps described herein. Rather, the specific features and steps are disclosed as preferred forms of implementing the claimed aspects. For example, network 206, processors 212 and 226, and other structures or systems described herein for which multiple types of implementing devices or structures are listed can include any of the listed types, and/or multiples and/or combinations thereof.

Some operations of example processes or devices herein are illustrated in individual blocks and logical flows thereof, and are summarized with reference to those blocks. The order in which the operations are described is not intended to be construed as a limitation unless otherwise indicated. Any number of the described operations can be executed, or data transmissions performed, in any order, combined in any order, subdivided into multiple sub-operations, or executed in parallel to implement the described processes. For example, in alternative implementations included within the scope of the examples described herein, elements or functions can be deleted, or executed out of order from that shown or discussed, including substantially synchronously or in reverse order.

Moreover, this disclosure is inclusive of combinations of the aspects described herein. References to "a particular aspect" (or "embodiment" or "version") and the like refer to features that are present in at least one aspect. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

In the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

What is claimed is:

1. A method comprising, by a control device of a telecommunications network:
   receiving a session-initiation message comprising a calling-party identifier and a called-party identifier;
   determining a context identifier associated with at least one of the calling-party identifier and the called-party identifier;
   selecting a first information server from a plurality of information servers as a selected information server in response to the context identifier indicating that the calling-party identifier and the called-party identifier are associated with a common communication-service tenant;
   selecting a second information server from the plurality of information servers as the selected information server in response to the context identifier indicating that the calling-party identifier and the called-party identifier are not both associated with the common communication-service tenant;
   retrieving calling-party identification information from the selected information server;
   determining a second session-initiation message comprising the calling-party identification information based at least in part on the session-initiation message; and
   sending the second session-initiation message via the telecommunications network.

2. The method according to claim 1, further comprising:
   sending a query to the selected information server based at least in part on the calling-party identifier; and
   receiving the calling-party identification information from the selected information server in response to the query.

3. The method according to claim 1, further comprising:
   sending a query to the selected information server based at least in part on the calling-party identifier, the query comprising the context identifier; and
   receiving the calling-party identification information from the selected information server in response to the query.

4. The method according to claim 3, further comprising determining the context identifier comprising one of the called-party identifier and the calling-party identifier, wherein the query comprises the other of the called-party identifier and the calling-party identifier.

5. The method according to claim 1, further comprising determining the context identifier based on both the calling-party identifier and the called-party identifier.

6. The method according to claim 1, wherein:
   the second session-initiation message comprises a Session Initiation Protocol (SIP) message;
   the SIP message comprises a P-Asserted-Identity header having a value;
   the value of the P-Asserted-Identity header is the calling-party identification information; and
   the method further comprises sending the second session-initiation message to a terminating control device via the telecommunications network.

7. The method according to claim 1, further comprising:
   determining that the session-initiation message was sent by an untrusted network entity;
   in response, determining the second session-initiation message excluding the calling-party identifier.

8. A control device of a telecommunications network, the control device comprising:
   a communications interface communicatively connectable with a terminal of the telecommunications network; and
   a control unit communicatively connected with the communications interface and configured to perform operations comprising:
     receiving a session-initiation message comprising a calling-party identifier and a called-party identifier;
     determining a context identifier associated with at least one of the calling-party identifier and the called-party identifier;
     selecting, as a selected information server, a first information server from a plurality of information servers in response to the context identifier indicating that the calling-party identifier and the called-party identifier are associated with a common communication-service tenant;
     selecting, as the selected information server, a second information server from the plurality of information servers in response to the context identifier indicating that the calling-party identifier and the called-party identifier are not both associated with the common communication-service tenant;
retrieving calling-party identification information from the selected information server via the telecommunications network based at least in part on the calling-party identifier and the context identifier;
determining a second session-initiation message comprising the calling-party identification information based at least in part on the session-initiation message; and
sending the second session-initiation message via the telecommunications network.

9. The control device according to claim 8, the operations further comprising:
before retrieving the calling-party identification information, sending a query to the selected information server via the telecommunications network based at least in part on the calling-party identifier; and
receiving the calling-party identification information from the selected information server via the telecommunications network.

10. The control device according to claim 8, the operations further comprising:
sending a query to the selected information server, the query comprising the context identifier; and
receiving the calling-party identification information from the selected information server in response to the query;
wherein the context identifier comprises one of the called-party identifier and the calling-party identifier and the query comprises the other of the called-party identifier and the calling-party identifier.

11. The control device according to claim 8, wherein:
the calling-party identifier is associated with the terminal;
the second session-initiation message comprises a Session Initiation Protocol (SIP) message;
the SIP message comprises a P-Asserted-Identity header having a value;
the value of the P-Asserted-Identity header is the calling-party identification information; and
the operations further comprise sending the second session-initiation message to a terminating control device via the telecommunications network.

12. The control device according to claim 8, wherein the called-party identifier is associated with the terminal, the operations further comprising:
determining that the session-initiation message was sent by an untrusted network entity;
in response, determining the second session-initiation message excluding the calling-party identifier.

13. One or more non-transitory computer-readable media comprising instructions that, when executed by at least one processor, cause the at least one processor to perform operations comprising:
receiving, via a telecommunications network, a query comprising context information and indicating a calling-party identifier;
selecting, based at least in part on the calling-party identifier and the called-party identifier being associated with the common communication-service tenant, a first information server as a selected information server;
selecting, based at least in part on the calling-party identifier and the called-party identifier not being associated with the common communication-service tenant, a second information server as the selected information server;
retrieving calling-party identification information from the selected information server;
determining a session-initiation message comprising the calling-party identification information; and
sending, via the telecommunications network, the session-initiation message.

14. The one or more non-transitory computer-readable media according to claim 13, wherein:
the calling-party identifier is selected from the group consisting of: an E.164 telephone number, an International Mobile Subscriber Identity (IMSI) value, a Global Title value, and a Session Initiation Protocol (SIP) Uniform Resource Identifier (URI).

15. The one or more non-transitory computer-readable media according to claim 13, the operations further comprising:
receiving, via a user interface, a provisioning calling-party identifier and a group of provisioning party identification information value(s); and
storing the group of provisioning party identification information value(s) in association with the provisioning calling-party identifier in the one or more computer-readable media.

16. The method according to claim 1, wherein the calling-party identifier and the called-party identifier are associated with a common communication-service tenant when a domain part of the calling-party identifier and a domain part of the called-party identifier match.

17. The method according to claim 1, wherein retrieving the calling-party identification information from the selected information server is according to a Diameter protocol.

18. The control device according to claim 8, wherein the calling-party identifier and the called-party identifier are associated with a common communication-service tenant when a domain part of the calling-party identifier and a domain part of the called-party identifier match.

19. The one or more non-transitory computer-readable media according to claim 13, wherein the calling-party identifier and the called-party identifier are associated with a common communication-service tenant when a domain part of the calling-party identifier and a domain part of the called-party identifier match.

20. The one or more non-transitory computer-readable media according to claim 13, wherein retrieving the calling-party identification information from the selected information server is based at least in part on the calling-party identifier and the context identifier.

* * * * *